United States Patent
Kim et al.

(10) Patent No.: US 7,284,264 B1
(45) Date of Patent: Oct. 16, 2007

(54) DISCOVERY OF AN ADVERTISING SERVICE IN E-SPEAK

(75) Inventors: Wooyoung Kim, Sunnyvale, CA (US); Sekhar R. Sarukkai, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1431 days.

(21) Appl. No.: 09/732,621

(22) Filed: Dec. 8, 2000

(51) Int. Cl.
*H04L 29/00* (2006.01)
*G06F 21/00* (2006.01)

(52) U.S. Cl. .............. 726/2; 726/12; 726/29; 713/159; 713/170; 709/202; 709/246

(58) Field of Classification Search ........... 713/201; 709/203, 219, 202; 707/10; 726/2, 12
See application file for complete search history.

(56) References Cited

U.S. PATENT DOCUMENTS

| | | | |
|---|---|---|---|
| 5,696,898 A * | 12/1997 | Baker et al. ................. 726/12 |
| 6,088,728 A * | 7/2000 | Bellemore et al. .......... 709/227 |
| 6,122,648 A * | 9/2000 | Roderick .................... 715/513 |
| 6,134,598 A * | 10/2000 | Raman ....................... 709/246 |
| 6,295,531 B1 * | 9/2001 | Bae et al. ....................... 707/4 |
| 6,363,398 B1 * | 3/2002 | Andersen ................ 707/103 R |
| 6,446,966 B1 * | 9/2002 | Crozier ........................ 273/236 |
| 6,516,350 B1 * | 2/2003 | Lumelsky et al. .......... 709/226 |
| 2001/0011222 A1 * | 8/2001 | Mclauchlin et al. ........... 705/1 |
| 2002/0138446 A1 * | 9/2002 | Antonin et al. .............. 705/67 |

* cited by examiner

*Primary Examiner*—Nasser Moazzami
*Assistant Examiner*—Carl Colin
(74) *Attorney, Agent, or Firm*—Fulbright & Jaworski LLP

(57) ABSTRACT

A method and system for locating resources outside a client's normal domain provides for the client to send a query to a core serving the client. The core then sends the query to remote core over a communication network. The remote core runs the query in an advertising service serving the remote core, then returns a message identifying a matching resource to the core serving the client. The core serving the client locates the remote core by searching for appropriate advertising services in a well-known portal. In some embodiments, the client's core authenticates itself to the remote core before the query is run. Accordingly, unauthorized clients are prevented from accessing resources registered with the advertising service serving the remote core.

6 Claims, 6 Drawing Sheets

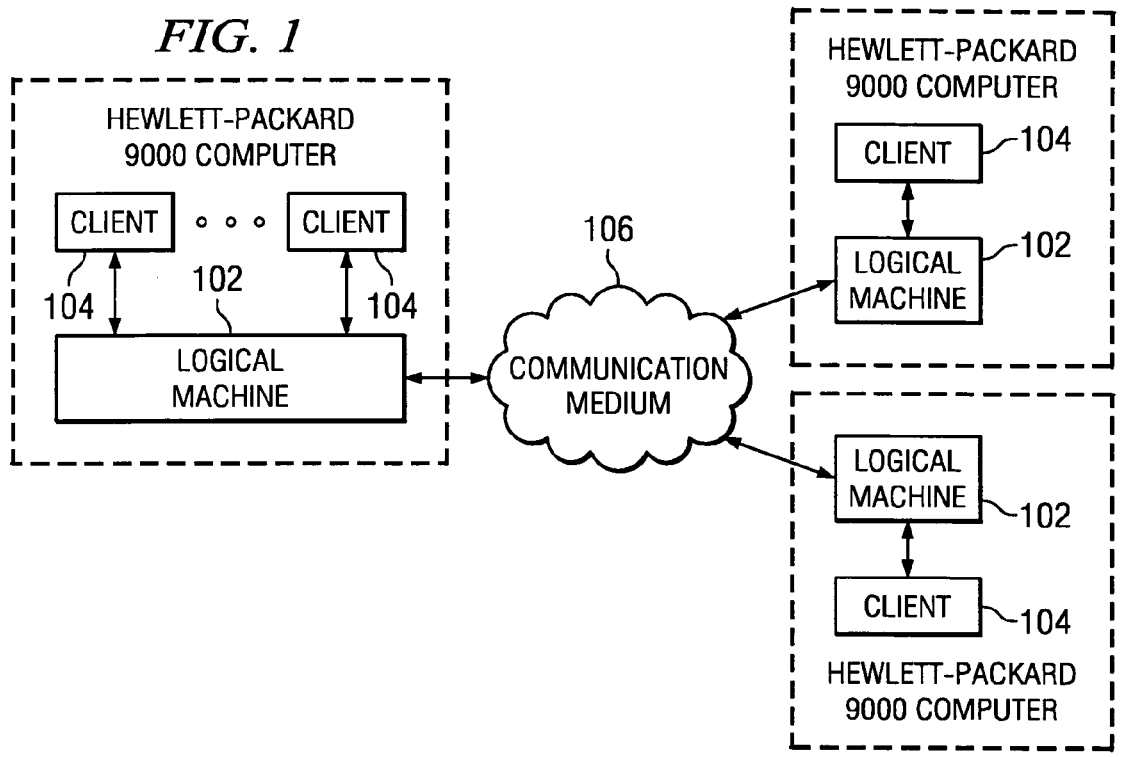
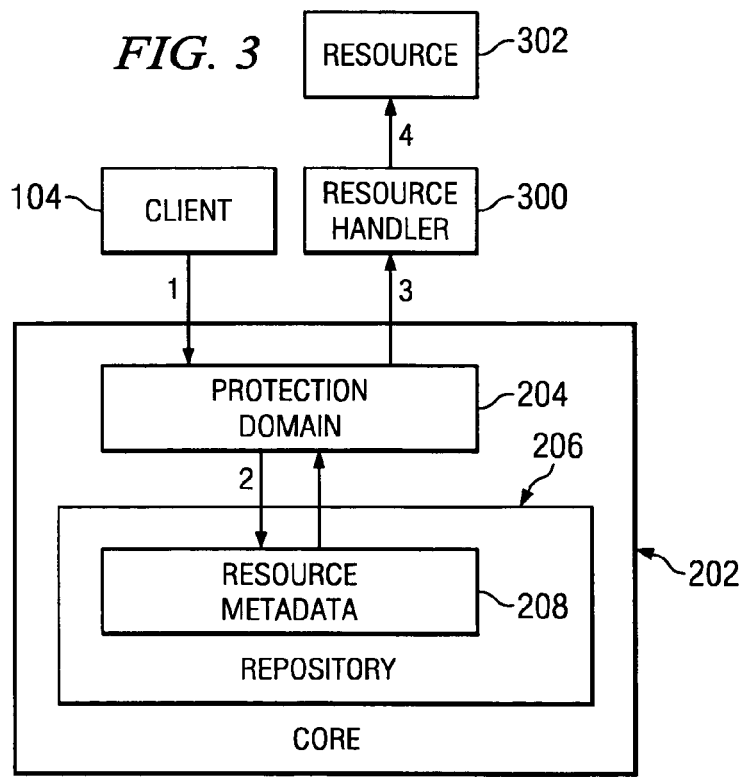

FIG. 5

| 502 | VOCABULARY | THE DEFINITION OF THE ATTRIBUTES AND THEIR TYPES USED IN DESCRIPTIONS AND LOOKUPS |
| --- | --- | --- |
| 504 | RESOURCE HANDLER MAILBOX | THE PROCESS/THREAD/TASK THAT HANDLES THE RESOURCE |
| 506 | CONTRACT | DENOTES THE APPLICATION PROGRAMMING INTERFACE (API) SUPPORTED BY THE PROVIDER, INCLUDING VERSION AND SIMILAR INFORMATION |
| 508 | VISIBILITY AND PERMISSIONS | ACCESS CONTROL INFORMATION |
| 510 | PRIVATE RESOURCE-SPECIFIC DATA | DATA IMPORTANT TO THE PROVIDER OF THE RESOURCE, SUCH AS THE PROVIDER'S INTERNAL NAME FOR THE RESOURCE |
| 512 | PUBLIC RESOURCE-SPECIFIC DATA | DATA IMPORTANT TO THE USER OF THE RESOURCE, SUCH AS A STUB FOR INVOKING METHODS |

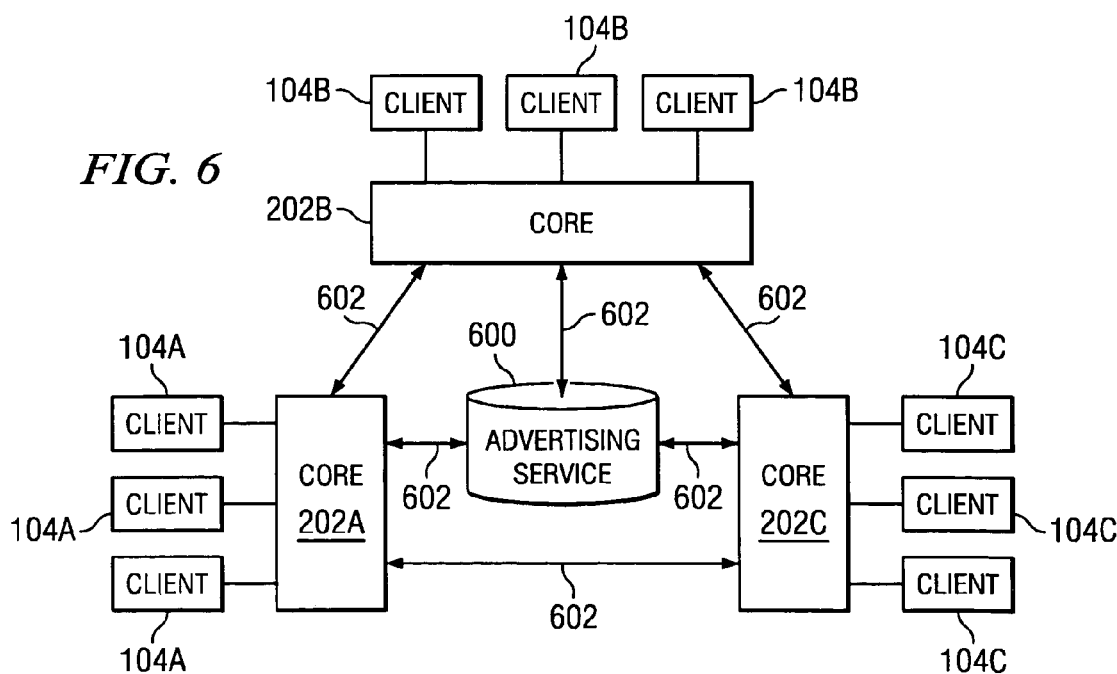

FIG. 6

DISCOVERY OF AN ADVERTISING SERVICE IN E-SPEAK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO APPENDICES A AND B

Appendices A and B contain an architectural specification and a programmer's guide.

CROSS-REFERENCE TO CD-ROM APPENDIX AND APPENDIX C

An Appendix containing a computer program listing is submitted on a compact disk, which is herein incorporated by reference in its entirety. The total number of compact discs including duplicates is two. Appendix C which is part of the present specification, contains a list of the files contained on the compact disk.

BACKGROUND

1. Field of the Invention

The present invention relates to a method and system for locating remote resources over a communication network.

2. Related Art

Recent advances in computer and network technologies have resulted in an increasing number of computer services being offered to an ever-increasing number of potential users of the resources. In a computer network, a computer that provides a service is generally termed a server computer or server, and a computer using the service is generally termed a client computer or client. The client may be any user of the service such as another computer, a computer device, or an application program. Moreover, a server in one context may be a client in another. For example, a computer with a large storage capacity may be a server that offers storage or filing service to clients. The same computer may not have its own printer, and may be a client using a printing service offered by another computer.

The vast number of computer services offered over computer networks such as the Internet are not useful unless they can be located by potential users of the services. Sun Microsystem's JINI™ distributed computing environment includes a discovery and join mechanism for locating services. In JINI's™ discovery and join mechanism, a requesting entity via a TCP connection. A requesting entity may use TCP to find a remote service, but the requesting entity must know how to connect to the remote service before making the request, thus the requesting entity must already know about the remote service. Accordingly JINI's™ discovery and join mechanism may not work well when a client is searching for a service outside the client's typical domain. Multicast typically works on a local area network. Even though it is possible to use multicast across domains, doing so may flood the network with data packets. Thus, use of JINI™ is limited to local area networks. Further, JINI™ lacks authentication support. JINI™ assumes all parties in the network are trusted. Thus, if a user connects her laptop to the network, she can automatically obtain full access to the services available in the network. Her access to the services available in the network cannot be limited.

SUMMARY

In accordance with the invention, a method and system are provided for locating resources outside a client's normal domain. The client sends a query to a core serving the client. The core then sends the query to a remote core over a communication network. The remote core runs the query in an advertising service serving the remote core, then returns a message identifying a matching resource to the core serving the client. In some embodiments, the client's core authenticates itself to the remote core before the query is run. Accordingly, unauthorized clients are prevented from accessing resources registered with the advertising service serving the remote core.

In some embodiments, the core serving the client locates the remote core by sending a query to a well-known portal. The well-known portal advertises resources which are listed on the advertising services of remote cores. The well-known portal runs the query, then returns to a connection object to the querying client's core. The connection object is used connect to the remote core served by an advertising service listing a resource matching the client's query. The client's core uses the connection object to connect to the remote core. Once connected to the remote core, the client's core then runs the client's query in the advertising service serving to the remote core.

BRIEF DESCRIPTION OF THE DRAWINGS

FIG. 1 illustrates an environment in which the present invention may operate.

FIG. 3 illustrates one embodiment of a communication flow when processing a client's request for a resource.

FIG. 5 illustrates one embodiment of a message sent to a core to register a resource.

FIG. 6 illustrates one embodiment of an advertising service.

DETAILED DESCRIPTION

Nomenclature

Figure 2:
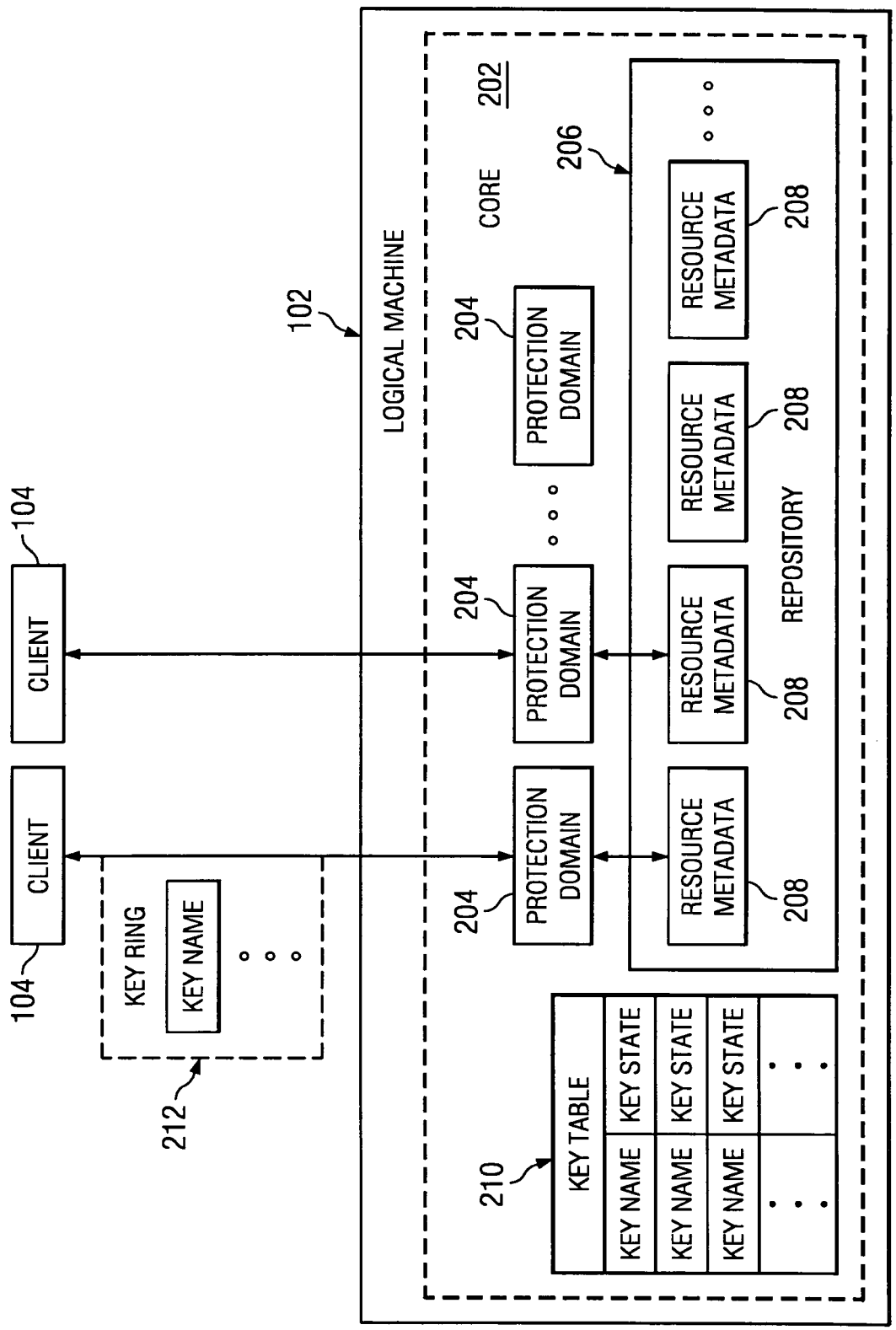
FIG. 2 illustrates, in a block diagram, one embodiment of a logical machine.

The detailed description that follows is presented largely in terms of processes and symbolic representations of operations performed by conventional computers. A computer may be any microprocessor or processor (hereinafter referred to as processor) control device, including terminal devices, such as personal computers, workstations, servers, clients, mini computers, main-frame computers, laptop computers, a network of two or more computers, mobile computers, portable computers, handheld computers, palm top computers, set top box for a TV, an interactive television, an interactive kiosk, personal digital assistant, an interactive wireless device, a mobile browser, or any combination thereof. The computers may possess input devices such as, by way of example, a keyboard, a keypad, a mouse, a microphone, or a touch screen, and output devices such as a computer screen, printer, or a speaker.

These computers may be single-processor or multi-processor machines. Additionally, these computers include memory such as a memory storage device or an addressable storage medium. The memory storage device and addressable storage medium may be in forms such as, by way of example, a random access memory (RAM), a static random access memory (SRAM), a dynamic random access memory (DRAM), an electronically erasable programmable read-only memory (EEPROM), a programmable read-only memory (PROM), an erasable programmable read-only memory (EPROM), hard disks, floppy disks, laser disk players, digital video disks, compact disks, video tapes, audio tapes, magnetic recording tracks, electronic networks, and other devices or technologies to transmit or store electronic content such as programs and data.

The computers execute an appropriate operating system such as HP-UX®, Linux, Unix, MICROSOFT®, WINDOWS® 95, MICROSOFT® WINDOWS® 98, MICROSOFT® WINDOWS® NT, WINDOWS® 2000 APPLE® MACOS®, IBM® OS/2®, and the like. The computers may advantageously be equipped with a network communication device such as a network interface card, a modem, or other network connection device suitable for connecting to one or more networks.

The computers, and the computer memory, may advantageously contain program logic or other substrate configuration representing data and instructions, which cause the computer to operate in a specific and predefined manner as described herein. The program logic may advantageously be implemented as one or more modules. The modules may advantageously be configured to reside in the computer memory and execute on one or more processors. The modules include, but are not limited to, software, and/or hardware components that perform certain tasks. Thus, a module may include, by way of example, components, such as, software components, processes, functions, subroutines, procedures, attributes, class components, task components, object-oriented software components, segments of program code, drivers, firmware, micro code, circuitry, data, and the like.

The program logic includes the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art to effectively convey teachings and discoveries to others skilled in the art.

The program logic is generally considered to be a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should be understood that manipulations within the computer are often referred to in terms of adding, comparing, moving, searching, or the like, which are often associated with manual operations performed by a human operator. It is to be understood that no involvement of the human operator may be necessary, or even desirable, in the present invention. The operations described herein are machine operations performed in conjunction with the human operator or user that interacts with the computer or computers.

It should also be understood that the programs, modules, processes, methods, and the like, described herein are but an exemplary implementation of the present invention and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in non-volatile memory, such as read-only memory (ROM).

Introduction to Architecture

The present invention provides a mechanism for locating remote computer resources which are not known to a client before. As used herein, a resource is a uniform description of active entities, (e.g., a computational service), or passive entities (e.g., a hardware device). Access to the resources is mediated by a resource-handling platform. The operations performed by the resource-handling platform necessary to mediate access to resources are performed on one or more logical machines. There may be multiple logical machines on a single physical machine such as a computer, or the components of a single logical machine may be distributed across multiple physical machines.

The resource-handling platform deals only with data about resources, not the data that makes up the resource. Such data describing resources are referred to herein as metadata. For example, when the resource-handling platform deals with a file resource, the resource-handling platform uses only data describing the attributes of the file and how the file is accessed. The resource-handling platform does not access the file directly. A resource-specific handler attached to the resource-handling platform directly accesses the file resource based on messages received from the resource-handling platform.

A client is an entity that requests access to resources or responds to such requests. Thus, a client may be a user or a service provider. Only a portion of the resource-handling platform is visible to each client. The portion of the resource-handling platform that is visible to the client is known as that client's protection domain. Each client has at least one client library. The client library provides a service interface for the client to connect to the client's resource handling platform. All client applications and resource-specific handlers are linked to the client library. The client library then communicates with the resource-handling platform through an application interface.

Access to a resource involves two stages. First, the resource-handling platform locates the resource and determines whether a client may access the resource. Once the resource is discovered and access is determined, the resource-handling platform sends messages to a resource-specific handler. The second stage is the direct access to the resource by the resource-specific handler.

Each logical machine has a core. All resource access is performed through the core. The core uses resource metadata to mediate and control each access to a resource. To access a resource, a client sends a message to the core naming the resource. The core uses the resource metadata to determine if access is allowed and to locate the appropriate resource handler. The core then forwards a message to the resource handler which actually accesses the resource.

In one embodiment, the invention is implemented using the Hewlett-Packard E-Speak Service Engine Development Platform Release 3.01 executing on a HEWLETT-PACKARD 9000™ computer running the HP-US® operating system version 11.00. In this embodiment, the resource-handling platform is the E-Speak environment. The service interface is the E-Speak Service Interface (ESI). The application interface is the E-Speak Application Binary Interface (ABI). E-Speak logical machines communicate with each other using the E-Speak Service Interchange Protocol (ESIP).

Referring now to the drawings, FIG. 1 illustrates an environment in which a resource locating system and method according to an embodiment of the present invention operate. In particular, the resource locating system and method may be implemented using the Hewlett-Packard E-Speak Service Engine Development Platform Release 3.01 executing on a HEWLETT-PACKARD 9000™ computer running the HP-UX® operating system version 11.00. As depicted in FIG. 1, the environment is comprised of three HEWLETT-PACKARD 9000™ computers, each including a logical machine 102 connected to one or more clients 104, connected to each other through a communication medium 106. In other embodiments, multiple logical machines 102 may reside in a single HEWLETT-PACKARD 9000™ computer. In still other embodiments, the components of an instance of logical machine 102 may be distributed across multiple HEWLETT-PACKARD 9000™ computers. In yet other embodiments, certain aspects of the resource locating system and method may be implemented on a single HEWLETT-PACKARD 9000™ computer. In such instances, the environment is comprised of the one or more clients 104 and logical machine 102 executing on a single HEWLETT-PACKARD 9000™ computer.

Although HEWLETT-PACKARD 9000™ computer, an E-Speak Service Engine Development Platform, and a HP-UX® version 11.00 are specified, those skilled in the art realize that other computers, development software, and operating systems can be used to implement the invention as disclosed herein. Accordingly, the invention is not limited to any particular type or brand of computer, operating system, or software development platform.

In one embodiment, an instance of logical machine 102 mediates access to one or more resources accessible through logical machine 102. In particular, logical machine 102 facilitates and controls the creation, management, and distribution of one or more resources and the permissions that may be associated with each resource. Logical machine 102 controls what actions may be performed on a resource and who may perform the action on the resource.

Client 104 may be an entity, such as, by way of example, a process, thread, service provider, and the like, that executes on a computer and that requests access to one or more resources or responds to such requests. Client 104 communicates with logical machine 102, for example, using one or more messages, to locate and access a resource. Client 104 and logical machine 102 may communicate utilizing transport mechanisms (e.g., TCP, HTTP, remote procedure call, shared memory, and the like). As depicted in FIG. 1, client 104 and logical machine 102 reside on the same computer. In other embodiments, one or more clients 104 may reside in a different computer from logical machine 102 and communicate with logical machine 102 through a network such as, for example, communication medium 106.

Communication medium 106 facilitates the transfer of electronic content between the attached computers. In some embodiments, communication medium 106 includes the Internet. The Internet is a global network connecting millions of computers. The structure of the Internet, which is well known to those of ordinary skill in the art, is a global network of computer networks and utilizes a simple, standard common addressing system and communications protocol called Transmission Control Protocol/Internet Protocol (TCP/IP).

Communication medium 106 may also be comprised of one or more other types of networks. By way of example, communication medium 106 can include local area networks (LANs), wide area networks (WANs), metropolitan area networks (MANs), public internets, private intranets, a private computer network, a secure internet, a private network, a public network, a value-added network, interactive television networks, wireless networks, two-way cable networks, interactive kiosk networks, and the like. Communication medium 106 may comprise other communication protocols such as the International Standards Organization's Open Systems Interconnection, IBM's SNA®, Novell's NETWARE®, and Banyon VINES®, that facilitate communication between the attached computers.

FIG. 2 is a block diagram illustrating one embodiment of an instance of logical machine 102. Logical machine 102 is a single instance of the modules and other components necessary to locate a resource by a client 104 as described herein. In particular, FIG. 2 illustrates selected components of the logical machine 102 according to one embodiment of the present invention. As shown, the logical machine 102 includes a core 202.

Core 202 processes requests to search for a resource based on one or more criteria, requests to make a resource or service accessible through core 202, requests to remove a resource from core 202, thus making the resource no longer accessible through core 202, and other requests that facilitate the management of the resources available through core 202. For example, to access a resource, client 104 sends a message to core 202 naming the resource that client 104 wants to access. Client 104, in requesting the resource, may specify and send a key ring 212 to core 202. Core 202 processes the received request and, using key ring 212 and the data and information maintained by core 202, determines if access to the resource is allowed. If access is allowed, core 202 forwards the message, for example, utilizing a routing module, for subsequent processing. In another example, core 202 processes a client 104 request to create a resource in core 202. The created resource is subsequently made available to other clients 104 wishing to access the resource.

As depicted in FIG. 2, core 202 is comprised of one or more protection domains 204, a repository 206, and a key table 210. In some embodiments, core 202 maintains at least one protection domain 204 for each client 104. The protection domain 204 contains the information core 202 needs in managing a corresponding client 104. Core 202 utilizes protection domain 204 maintained for the particular client 104 in processing messages received from the respective client 104. Protection domain 204 encapsulates the respective client's 104 view of the system of resources and mediates communication between the respective client 104 and the requested resources. A client 104's environment is maintained in the modules, data, and other information contained in an instance of protection domain 204.

In one embodiment, client 104 can have more than one protection domain 204 in core 202. In such instance, client 104 specifies a default or active protection domain 204. Core 202, in processing client 104's request to access a resource, uses the respective client 104's active protection domain. For example, when core 202 receives a message from client 104, the core uses the information contained in client 104's active protection domain 204 to determine if access should be granted. Core 202 includes one or more functions that client 104 can use to create and modify a corresponding protection domain 204, as well as select another protection domain 204 as active protection domain 204.

FIG. 3 is an event diagram illustrating an exemplary method of communication flow between client 104 and the core when a client requests a resource. Client 104 first connects to core 202 which identifies the client 104 and instantiates an instance of the protection domain 204 belonging to client 104. In event 1, client 104 sends a message to core 202. Client 104 specifies information such as a requested resource 302, a requested operation or method on a resource 302, and the like. Protection domain 204 advantageously mediates the message sent by the corresponding client 104.

Core 202 then checks if client 104 has permission to access the requested resource or operation or method on the resource in event 2. Once permission is negotiated, core 202 sends a message to a resource handler 300 in event 3. The message payload is the message contents sent by client 104 to core 202 requesting the resource, less any permission information and other data intended for core 202. An appropriate resource handler is specified in a resource handler field of resource metadata 208 retrieved from a repository of core 202.

The requested resource operation is performed in event 4. If the requested resource is an activity, such as a process executing on a computer, the resource handler may send the resource a message requesting an authorized operation. If the requested resource is a passive resource, (e.g. a file) the resource handler may execute an authorized operation requested by client 104.

Locating Resources Within a Client's Domain

Figure 4A:
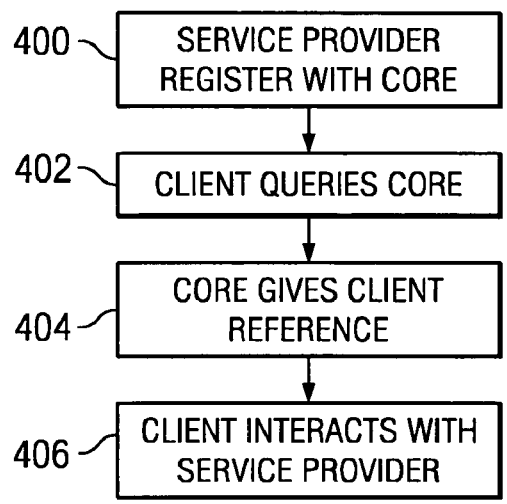
FIG. 4A illustrates, in a flowchart, one embodiment for locating a resource.
Figure 4B:
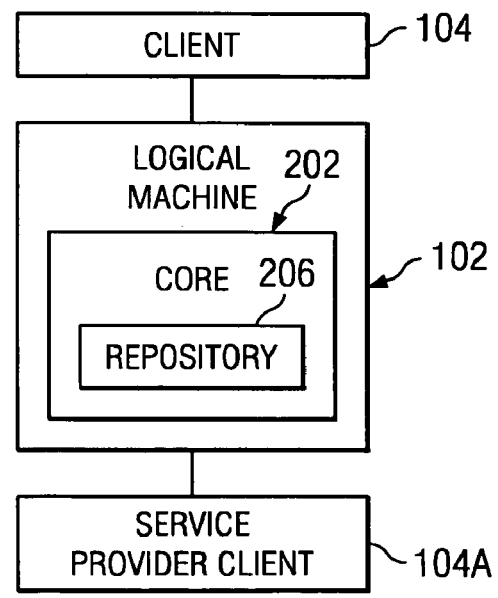
FIG. 4B illustrates a system for implementing the method of FIG. 4A.

Efficient and accurate location of resources is crucial to the proper functioning of the architecture described above. FIG. 4A is a flowchart illustrating one method of locating resources. FIG. 4B is a block diagram illustrating a system suitable to implement the method of FIG. 4A. FIG. 4B includes a logical machine 102 with a core 202 and a repository 206 as described above in reference to FIG. 2.

In stage 400 (FIG. 4A), a client 104A who is a service or resource provider registers its service with core 202. Core 202 thus stores a description of the resource provided by client 104A in the repository 206 of core 202. FIG. 5 illustrates an example of a description 500 of a resource submitted to core 202 to be stored in repository 206. In same embodiments, description 500 is a message sent to core 202 by client 104A.

Description 500 includes a vocabulary 502 and a contract 506. Vocabulary 502 defines the attributes of the resource. The service provider specifies a vocabulary, then the attributes of the resource. For example, if the resource a client wants to register is a car for sale, the vocabulary may be "car" and the car vocabulary may have two attributes, "model" and "price." In some embodiments, vocabulary 502 may be specified as an XML schema.

Contract 506 describes the application programming interface (API) supported by the service provider. Description 500 may also include a resource handler mailbox 504, visibility and permissions 508, private resource-specific data 510, and public resource-specific data 512. Resource handler mailbox 504 contains information for a resource specific handler which handles request messages to the resource from clients. Visibility and permissions 508 define who may access the resource. Private resource-specific data 510 describes data important to the provider of the resource, such as the resource provider's internal name or reference number for the resource. Public resource-specific data 512 describes data important to a user of the resource. Resource specific data of a service is data specific to the service. It is not used for finding the service, rather it helps a client understand the service. Public means any client who finds the service may access the resource specific data. Private means only the one who registered the service may access the data. For example, if a printer is a service, the client registering the printer service may include the history of the printer, such as when it is purchased, when it is installed, etc., in the public resource specific data. There is no restriction on the resource specific data; any information can be stored. Typically, private resource data 510 and public resource data 512 are not interpreted by core 202.

Returning to FIG. 4A, in stage 402, another client 104 queries core 202 with a description of a resource sought by client 104. Core 202 checks the client's query against the resource descriptions stored in repository 206. In some embodiments, both vocabulary 502 and contract 506 of a resource listed in repository 206 must match the client's query in order to be considered a match. If a match is found, core 202 sends a message to client 104 (stage 404). The message contains a reference to the service provider client 104A who registered the matching resource with core 202. The client then interacts with service provider client 104A as described in reference to FIG. 3.

In the method described in FIGS. 4A and 4B, all messages between a client 104 seeking resources and a client 104A providing resources are handled by the core. The method described in FIGS. 4A and 4B works efficiently as long as the number of participants is small, for example, if the participants are employees in one particular office and the resources are office services such as printers, copiers, and the like. If the number of participants is large, multiple cores may be necessary to support all the participants, thus a client may need to search all cores in order to find the most appropriate resource. Searching each core individually takes time and computer resources. Accordingly, the repositories of each core are sent to a single entity which stores the repositories and responds to queries from clients. This single entity is referred to as an advertising service.

FIG. 6 illustrates an exemplary embodiment of an advertising service. In a typical embodiment, the logical advertising service consists of a persistent repository and a number of physical advertising services, one for each core. A physical advertising service directly communicates only with the core to which it is directly connected. Depending on the operation mode, the logical advertising service may (offline mode) or may not (online mode) have a persistent repository. In some embodiments, a light weight directory access protocol (LDAP) server, available from many vendors such as Netscape, Oracle, and Novel, may be used as a persistent repository.

The logical advertising service is connected to three cores: 202A, 202B, and 202C. The cores are also connected to each other so the cores can communicate directly without going through the advertising service, for example, after a resource has been identified from the advertising service. In some embodiments, connections 602 are not direct connections between the cores and between the cores and the advertising service, rather each of the cores and the advertising service are connected to a communication network such as the Internet.

Each core serves a number of clients 104A, 104B, and 104C. A client providing a resource registers with the client's core. Once a client has registered with a core, only that core sends messages to and receives messages from the client relating to the resource handling platform. The core with which the client has registered is also referred to as the system core. For a given client, any core other than the system is referred to as a remote core. For example, once client 104A was registered with core 202A, only core 202A may send/receive messages to/from client 104A. After client 104A sends a message to core 202A to register its resource, client 104A's registration information is stored in the repository of core 202A. Upon client 104A's request, core 202A may also forward client 104A's registration information to advertising service 600. As a result, advertising service 600 contains a copy of the registration information of a resource which wishes to announce its existence.

A client looking for a resource sends a query to that client's core. For example, client 104B may only send a query to core 202B. Core 202B then searches for a match in its own repository. If no match is found in the repository of core 202B, the query is forwarded to advertising service 600, which runs the query against the advertised descriptions in advertising service 600.

Figure 7A:
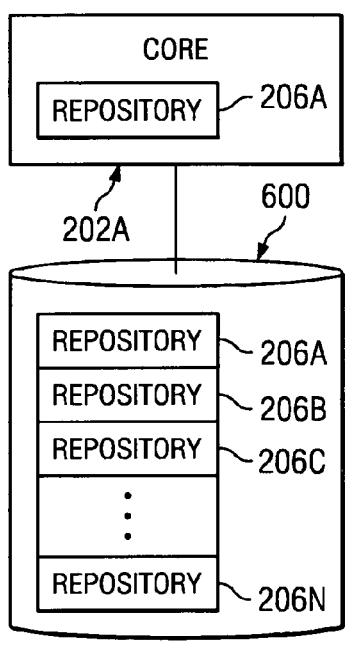
FIG. 7A illustrates an advertising service operating in offline mode.

Advertising service 600 may operate in one of two modes, online mode and offline mode. Clients using the advertising service do not notice any differences between online mode and offline mode except that, in online mode, since the logical advertising service does not have a persistent repository, all the advertised information is lost and invalidated and when the core is shut down. FIG. 7A illustrates an advertising service operating in offline mode. Advertising service 600 contains copies of several repositories 206A-206N propagated to the advertising service by cores 202A-202N served by the advertising service. Core 202A, connected to advertising service 600, contains only its own repository 206A. When advertising service 600 receives an entry from core 202A, advertising service 600 stores that entry in its persistent repository. Since all physical advertising services share the same persistent repository, all advertised information is implicitly shared by all the physical advertising services.

Figure 7B:
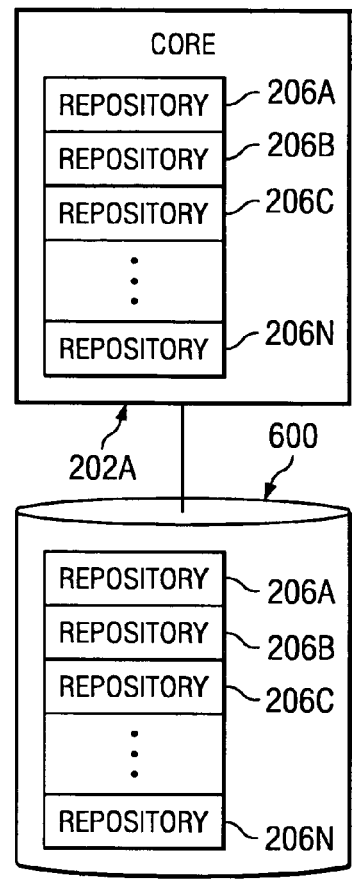
FIG. 7B illustrates an advertising service operating in online mode.

FIG. 7B illustrates an advertising service operating in online mode. Advertising service 600 contains copies of several repositories 206A-206N propagated to the advertising service by cores 202A-202N served by the advertising service. Core 202A, connected to advertising service 600, contains its own repository 206A, and copies of all the other repositories 206B-206N stored in advertising service 600. Since the advertising service does not have a shared persistent repository in online mode, physical advertising services share advertised information by multicasting the information among the physical advertising services that comprise a logical advertising service. The logical advertising service 600 contains copies of several resource descriptions advertised to the logical advertising service by cores 202A-202N. When a logical advertising service receives an entry from a core, it disseminates the entry to all constituent physical advertising services so that it is shared by the physical advertising services. The entry multicasted to physical advertising services contains a description of the core to which the entry belongs. Though the description of a resource may be replicated in multiple places, the handle for the resource is only stored in the one core serving the resource. Accordingly, a client searching for a resource on a remote core must go through that resource's own core, as only the resource's own core can route messages to the resource.

Figure 8:
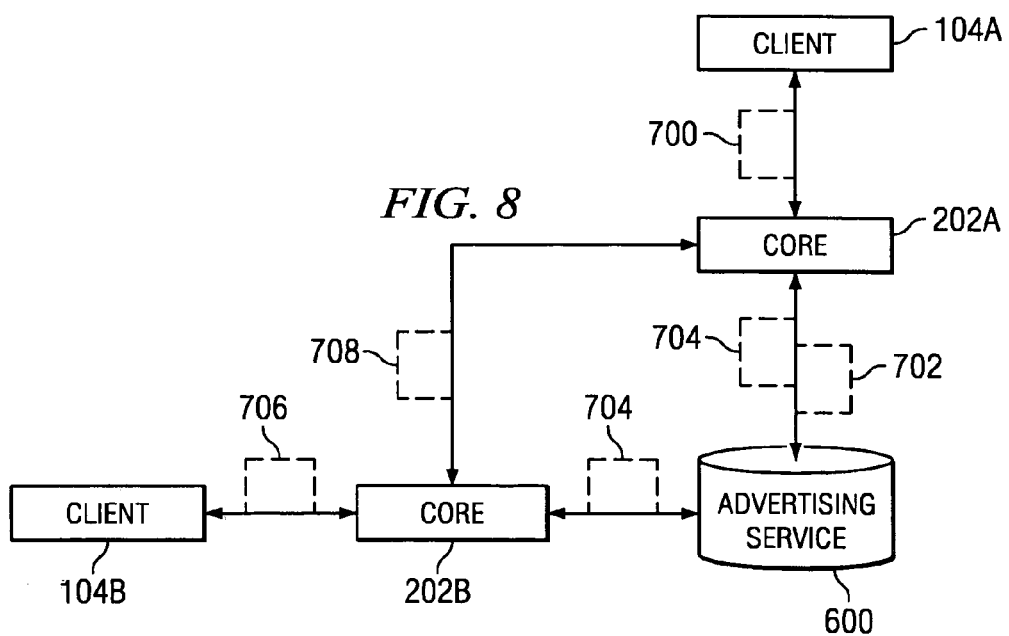
FIG. 8 illustrates locating and accessing a resource registered on a remote core using an advertising service.

FIG. 8 illustrates a method of locating a resource registered with a remote core, using an advertising service in online mode. A service provider client 104A registers his resource with core 202A by sending message 700. Message 700 is described in reference to FIG. 5. Core 202A then registers client 104A's resource with advertising service 600 by sending message 702. Message 702 contains a portion of the information of message 700, such as the vocabulary and the contract of client 104A's resource. Message 702 also identifies core 202A as client 104A's core. Message 702 does not contain information such as the resource handler mailbox of FIG. 5. The description of client 104A's resource is then stored in advertising service 600. Advertising service 600 then sends a message 704 to all other physical advertising services that serve other cores, advising of client 104A's resource.

Client 104B searches for a resource by sending a query 706 to core 202B. Core 202B first runs the query against core 202B's own repository. If a resource is located in core 202B's repository, reference to that resource is forwarded to client 104B. If no match is found in core 202B's own repository, core 202B sends the query to the physical advertising service in logical advertising service 600. If a match is found, for example, if client 104A's resource matches client 104B's query, core 202B sends a message 708 to core 202A using the information found in the physical advertising service to request client 104A's resource. Core 202A then checks client 104B's permission and forwards the resource handler address to core 202B according to the process described in reference to FIG. 3.

Locating Resources Outside a Client's Domain

A client may wish to access resources that are outside a client's domain. Through the core with which a client has registered, also called the "home core," the client can discover the resources of all the cores served by the same advertising service as the client's home core. For example, a client's home core may represent the client's particular office within a company. The advertising service may advertise resources available at any of the offices in the company. The resources available through the logical advertising service to which the client's home core is connected are within the client's domain. Occasionally, a user must look beyond her client's domain to find resources. For example, when the user is travelling to a place where his/her company does not have an office, in order to locate a nearby resource, such as a print shop, she must search outside his/her domain. Accordingly, a mechanism is provided for a client to locate resources outside the client's domain.

Figure 9A:
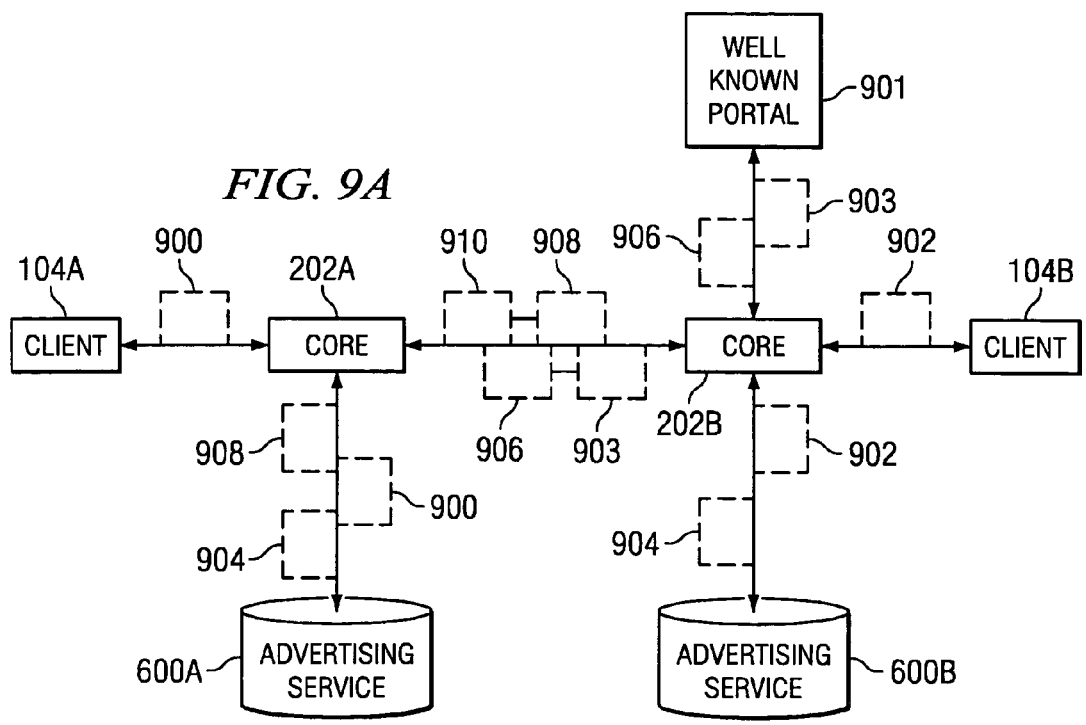
FIG. 9A illustrates one embodiment of a system for discovering resources across multiple advertising services.
Figure 9B:
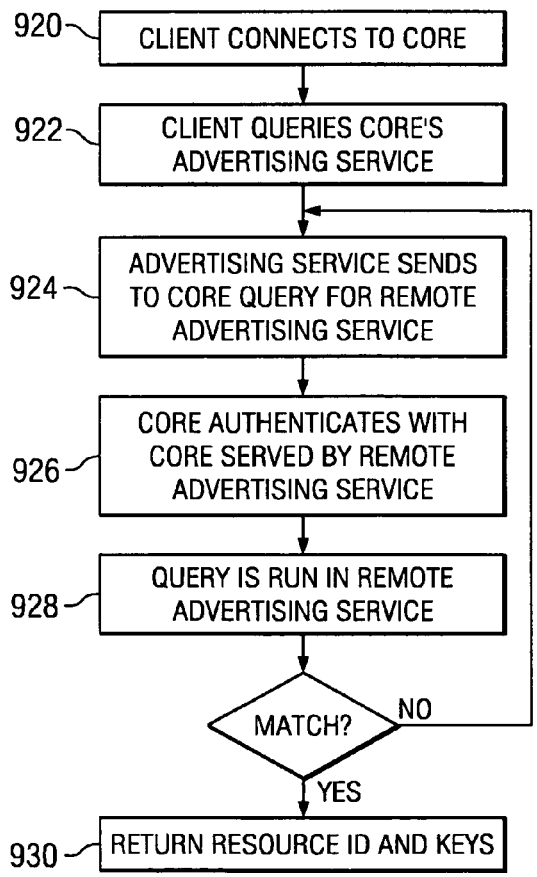
FIG. 9B illustrates one embodiment of a method of discovering resources outside a client's domain.

FIG. 9B illustrates an exemplary method of locating a resource outside a client's domain. FIG. 9A illustrates a system appropriate for implementing the method described in FIG. 9B. In stage 920 (FIG. 9B), the client connects to the client's home core. The client searches for a resource by querying the advertising service serving the home core in stage 922. The advertising service runs the query against the repositories stored locally. If no match is found, the advertising service sends the query to remote advertising services (stage 924).

In some embodiments, all advertising services advertise themselves by registering with a well-known portal that can be used by anyone to advertise and can be queried by anyone looking for services. Each advertising service advertised on the well-known portal includes a description of the advertising service and a connection object for connecting to a core served by the advertising service. The connection object is a piece of information which may be used to make connection to a core served by the advertising service. In some embodiments, the advertising services of an organization advertise themselves to a representative advertising service which in turn advertises itself to the well-known portal. In other embodiments, the querying advertising service selects one or more advertising services advertised on the portal in which to run the querying advertising service's query.

Figure 9C:
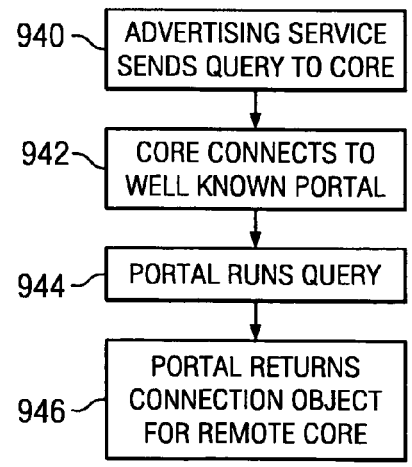
FIG. 9C illustrates, in a flowchart, one embodiment of a method of locating a remote advertising service using a well-known portal.

FIG. 9C illustrates an embodiment of a method of locating a remote advertising service using a well-known portal, stage 924 of FIG. 9B, in more detail. In stage 940, the advertising service serving the home core sends a query to locate a remote advertising service a well-known portal through the home core. The core connects to the well-known portal in stage 942 and sends the query to the well-known portal. In stage 944 the query is run in the well-known portal. If a match is found, the portal returns a connection object for a remote core served by the remote advertising service matching the query. The process then returns to stage 926 in FIG. 9B.

In stage 926, the client's home core connects to the remote core served by the remote advertising service in which the querying advertising services wishes to query, and authenticates itself with the remote core. The home core presents the query along with the requesting client's key ring. The remote core checks the keys presented in the key ring against the locks on the resources requested by the client. Authentication is described in more detail in U.S. application Ser. No. 09/675,263, filed Sep. 28, 2000, commonly assigned, entitled "An Access Control Mechanism For Remote Method Invocations Using Method-Permission Maps," and incorporated herein in its entirety by this reference. In one embodiment, core-to-core authentication is performed using ESIP.

Once the home core is authenticated by the remote core, the client's query is run in the remote advertising service (stage 928). If a match is found, the remote core returns a message identifying the matching resource (stage 930). The remote core may also return a key ring representing the client's capability to access resources advertised in the remote advertising service. If no match is found, the remote advertising service repeats the process beginning with stage 924 sending the query to another advertising service.

FIG. 9A illustrates a system for implementing the embodiment described in FIG. 9B. A service provider client 104A first registers with a core 202A by sending message 900. Client 104A's resource is registered in the repository of core 202A and replicated in advertising service 600A. A service seeking client 104B sends a query 902 to the client's home core 202B requesting a resource. The query is run in the home core's advertising service 600B. If no match is found, the query is returned to home core 202B in message 904. Message 904 may also include identification of a remote advertising service in which to run the query contained in message 904.

If no remote advertising service is specified by the advertising service, query 906 is sent to well-known portal 901. Well-known portal 901 searches for a matching advertising service. If a match is found, a connection object 903 for connecting to a core served by the matching remote advertising service is returned to core 202B.

Home core 202B uses connection object 903 to connect to remote core 202A. Core 202B sends query 906, along with the client's key ring for authentication, to remote core 202A. Core 202A authenticates home core 202B, then runs query 906 in remote core 202A's advertising service 600A. If a match is found, advertising service 600A returns a message identifying the matching resource 908 to remote core 202A. Message 908, along with a key ring 910 representing client 104B's capability to access the resources in advertising service 600A, is then returned to core 202B. Core 202B can then access the resource using the resource identification and client 104B's key ring.

In accordance with the above described embodiment, a core served by an advertising service querying a remote advertising service is authenticated by a core served by the remote advertising service before any query is run in the remote advertising service. Thus, unauthorized users are prevented from accessing the resources advertised in the remote advertising service. For example, a consultant who works for company 1, but is consulting at company 2, can connect to his/her core at company 1 and query his/her core for a resource at company 2. The consultant's home core queries the home core's advertising service. When no match is found, the company 1 home core sends a query to be run in an advertising service serving a company 2 core. The company 1 home core can locate the company 2 advertising service by first connecting to a well-known portal. The company 1 core authenticates itself with the company 2 core. The company 2 core thus grants the consultant the capability to access company 2 resources granted to company 1. The advertising service serving the company 1 core thus runs its query in the advertising service serving the company 2 core, then returns the resource at company 2 requested by the consultant.

Various modifications and adaptations of the embodiments and implementations described herein are encompassed by the attached claims. The invention is not limited to the hardware or the software described herein. The cores described herein may be any suitable computer or personal electronic device. In addition, the resources described in this disclosure are not limited to the particular resources described herein. The embodiments described above are to be considered as illustrative only and not restrictive. The following claims rather than the foregoing description indicate the scope of the invention.

We claim:

1. A method of locating a remote resource using a system core, the method comprising:
   receiving a query from a client;
   prior to sending the query, running the query in an advertising service associated with the system core
   sending the query from the system core to a remote core over a communication network; and
   in response to the query, receiving from the remote core a message identifying a remote resource.

2. A method of locating a remote resource using a system core, the method comprising:
   receiving a query from a client;
   prior to sending the query, locating a remote core by:
      accessing a portal;
      sending a query to be run in the portal; and
      receiving a connection object from the remote core associated with a remote advertising service matching the query run by the portal
   sending the query from the system core to the remote core over a communication network; and
   in response to the query, receiving from the remote core a message identifying a remote resource.

3. The method of claim 2, further comprising:
   establishing a connection with the remote core using the connection object;
   retrieving an identification of a resource handler of a remote resource matching the query received from the client; and
   contacting the resource handler to access the remote resource.

4. A system for locating remote resources, the system comprising:
   a system core connected to a communication network;
   a system core computer program executable by the system core, the system core computer program comprising computer instructions for:
      receiving a query from a client;
      sending the query to a remote core; and
      in response to the query, receiving from the remote core a message identifying a remote resource; and
   an advertising service associated with the system core;
   wherein the system core computer program further comprises computer instructions for:
      running the query from the client against the advertising service prior to sending the query.

5. A system for locating remote resources, the system comprising:
   a system core connected to a communication network; and
   a system core computer program executable by the system core, the system core computer program comprising computer instructions for:
      receiving a query from a client;
      sending the query to a remote core; and
      in response to the query, receiving from the remote core a message identifying a remote resource; and
   a portal connected to the communication network;
   wherein the system core computer program further comprises computer instructions for:
      locating the remote core by accessing the portal;
      sending a query to be run by the portal; and
      receiving a connection object from the remote core associated with a remote advertising service matching the query run by the portal.

6. The system of claim 5 wherein the system core computer program further comprises computer instructions for:
   sending the query to the remote core by invoking a connection with the remote core using the connection object; and
   retrieving an identification of a resource handler from the remote core, wherein the resource handler handles a remote resource matching the query received from the client.

* * * * *